United States Patent [19]
Breitweiser

[11] 3,717,746
[45] Feb. 20, 1973

[54] THERMALLY SHRINKABLE DEVICES
[75] Inventor: Gary C. Breitweiser, Santa Barbara, Calif.
[73] Assignee: Sloan Technology Corporation, Santa Barbara, Calif.
[22] Filed: June 8, 1970
[21] Appl. No.: 44,006

[52] U.S. Cl..............219/200, 174/DIG. 8, 219/535, 264/230, 264/342
[51] Int. Cl..............................................H05b 1/00
[58] Field of Search...................219/200, 543, 535; 29/446–447; 264/230, 27, 342, DIG. 71; 174/DIG. 8; 156/84–86, 272, 275

[56] References Cited

UNITED STATES PATENTS

| | | | |
|---|---|---|---|
| 3,118,960 | 1/1964 | Cook | 264/230 |
| 3,318,994 | 5/1967 | Perrone et al. | 264/230 X |
| 3,093,526 | 6/1963 | Price et al. | 264/230 X |
| 2,328,845 | 9/1943 | Pike et al. | 264/342 X |
| 3,092,439 | 6/1963 | Harrison | 264/342 R X |
| 3,347,970 | 10/1967 | Hanna | 264/342 R X |
| 3,616,152 | 10/1971 | Chandler | 156/84 |

*Primary Examiner*—C. L. Albritton
*Attorney*—Angus and Mon

[57] ABSTRACT

A uniformly shrinkable device having regions which are to be selectively shrunk, and a method for locally shrinking those regions. A body which is shrinkable by the application of heat has a surface carrying a layer of electrically conductive material which generates heat as a consequence of passage of an electrical current. The layer is in thermal contact with the surface and covers an area of it to be shrunk which is of less extent than the total area of the surface. Passing electrical current through the layer thereby selectively shrinks a selected surface pattern of the surface, namely that adjacent to it.

4 Claims, 6 Drawing Figures

PATENTED FEB 20 1973 3,717,746

INVENTOR.
GARY C. BREITWEISER
BY Angus & Mon
ATTORNEYS.

THERMALLY SHRINKABLE DEVICES

This invention relates to the locally shrinking of thermally shrinkable bodies so as to shrink them in a selected pattern.

Heretofore, thermally shrinkable elements, such as thermoplastic polymer tubes, have been shrunk over electrical components and elongated objects, such as conductors, in an oven. Examples of such thermally shrinkable elements include thermally shrinkable tubes constructed of thermoplastic polymer, such as a polyolefin, polyvinylidene fluoride, polytetrafluorethylene, polyvinyl chloride, neoprene, silicone rubber or Mylar. Thermally shrinkable tubes of this class are ordinarily constructed by heating the polymer to a temperature wherein the molecules are arranged systematically into a highly ordered crystalline structure. The crystalline structure is altered by subjecting the tube to high energy Beta radiation to form cross links between chains of molecules. The tube is then deformed or stretched by applying a stress to it, ordinarily across its diameter, and the tube is thereafter cooled to below its crystalline melting point, while being held in the stressed state. The tube remains in the deformed or stretched configuration until it is again heated to a temperature above its crystalline melting point, whereupon the tube shrinks to the shape it had prior to stretching. This last shrinking step is known as "heat shrinking", and it is to materials exhibiting this characteristic that this invention is directed.

Heretofore, selective shrinking of thermally shrinkable elements has only been accomplished with elements which have been selectively stressed in selected regions so that only the prestressed portions shrink. Before this invention, it has not been possible to selectively shrink thermally shrinkable elements which had been uniformly prestressed or which had been prestressed in a pattern different than that which was ultimately to be provided by the shrinking process.

It is an object of the present invention to provide thermally shrinkable elements which are capable of being shrunk in predetermined patterns, regardless of the pattern of prestressing.

Another object of the present invention is to provide thermally shrinkable elements with a thin layer of resistive material which, upon application of an electrical current therethrough, locally heats the element thereby selectively shrinking the element in the regions where the resistive material is located.

In accordance with the present invention a resistive film is applied to a surface of a shrinkable element, such as a thermoplastic polymer in a predetermined pattern. Upon application of a predetermined current to the resistive film, the film heats the thermoplastic polymer, thereby shrinking the polymer in the regions where the film is located. The thickness of the film is selected so that, as the element shrinks beneath it, it deforms to follow its changing configuration.

One feature of the present invention resides in the fact that the film may be applied in any predetermined pattern to the shrinkable element and may even be applied in situ.

The above and other features of this invention will be more fully understood from the following detailed description and the accompanying drawings, in which.

Figure 1:
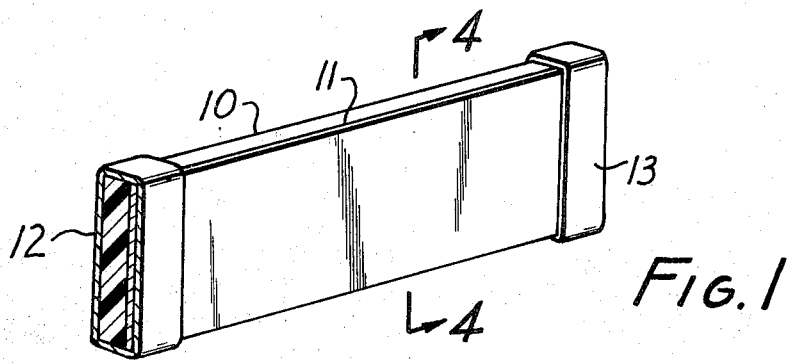
FIG. 1 is a perspective view of a shrinkable element in accordance with the presently preferred embodiment of the present invention.
Figure 4:
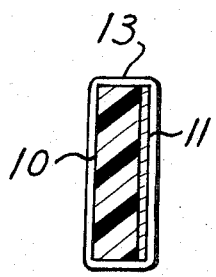
FIG. 4 is a section view taken at line 4—4 in FIG. 1.

Referring to the drawings, and particularly to FIGS. 1 and 4, there is illustrated a thermally shrinkable element 10 comprising a strip constructed of thermoplastic polymer, such as polyolefin, polyvinylidene fluoride, polytetrafluoroethylene, polyvinyl chloride, neoprene, silicone rubber or Mylar. Thermally shrinkable element 10 is an elongated substantially rectangular strip constructed by heating a polymer to a temperature wherein the molecules are arranged systematically into a highly ordered crystalline structure. The crystalline structure is altered by subjecting the strip to high energy Beta radiation to form cross-links between chains. The strip is then deformed or stretched, preferably along its length, by applying a stress to it and the strip is thereafter cooled to below its crystalline melting point, while being held in the stressed state. The strip remains in the deformed or stretched configuration until it is again heated to a temperature above its crystalline melting point, whereupon the strip thermally shrinks to the shape it had prior to stretching. Thermally shrinkable material of the class described is well known in the art and is readily available on a commercial basis, particularly in the form of thermally-shrinkable tubes.

In accordance with the present invention, layer 11 of resistive material is deposited onto a portion of the surface of element 10 and layers 12 and 13 are deposited over element 10 and layer 11 at each end of the strip. Layer 11 may be constructed of any suitable resistive material, such as aluminum, to form a resistor, having a resistance of the order of about 10 ohms. Layers 12 and 13 may be constructed of silver or other conductive material for the purposes of providing conductive contact to the resistive film. The particular material forming contact layers 12 and 13 may be any desirable conductive material, but should be adherent to both the polymer which forms element 10 and the material which forms resistive film 11.

Layers 11, 12 and 13 may each have a thickness of the order of about 4,000 Angstroms, but the thickness of each layer will depend upon the characteristics of the resistive film desired as well as the characteristics desired for the contacts formed by layers 12 and 13.

Films 12 and 13 may be applied in any suitable manner, such as by applying them onto the tube with a brush to form a "thick film" of material. Of course, the layers may be applied by deposition techniques, such as by vacuum deposition or chemical deposition processes.

Figure 2:
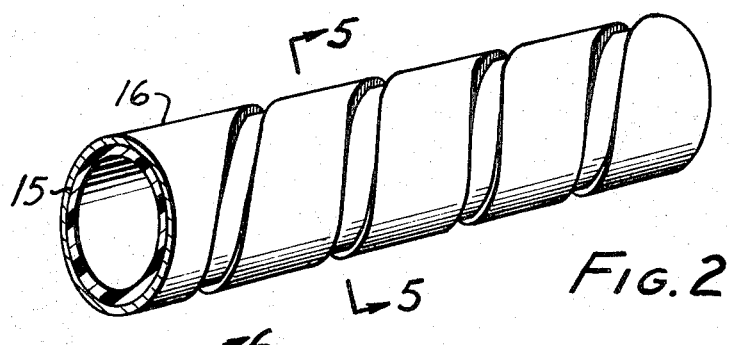
FIG. 2 is a perspective view of another shrinkable element in accordance with a modification of the present invention.
Figure 3:
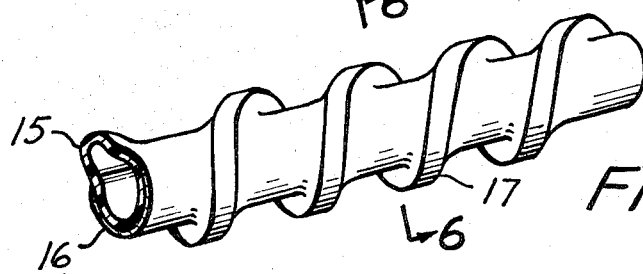
FIG. 3 is a perspective view of the shrinkable element illustrated in FIG. 2 after having been shrunk.
Figure 5:
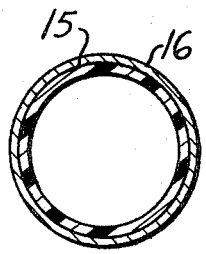
FIG. 5 is a section view taken on line 5—5 in FIG. 1.
Figure 6:
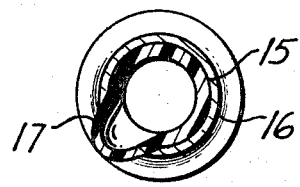
FIG. 6 is a section view taken at line 6—6 in FIG. 3.

One feature of the present invention resides in the fact that resistive layer 11 may be deposited onto element 10 in a selected pattern and the layer may be applied in situ, such as by painting it on with an ordinary paint brush. Thus, in FIGS. 2, 3, 5, and 6 there is illustrated a shrinkable tube 15 having a layer 16 of resistive material deposited thereon in a helical pattern. As in the case of the thermally shrinkable element shown in FIGS. 1 and 4, the thermally shrinkable element shown in FIGS. 2 and 5 is a suitable polymer having a layer 16 of resistive material deposited thereon. When current is applied to the resistive layer 16 of the element shown in FIG. 2, the resistance layer acts as a heater and heats the portion of the polymer directly adjacent the resistor (which is ordinarily directly below it) to shrink the tube in the helical pattern as illustrated in FIG. 3. The shape of the tube after having been shrunk comprises a tube of relatively small diameter having an enlarged portion 17 extending helically along its length. The resistive film is thin enough so it will warp or buckle as the supporting element shrinks without breakage of the electrical connection.

Although the present invention has been described in connection with the shrinking of shrinkable strips and tubes, it is to be understood that the shrinkable element in accordance with the present invention may take on any selected pattern and may, for example, be an elongated cord. The shrinkable element in accordance with the present invention may fulfill may types of requirements and even as a source of force. It has been determined that shrinkable material of the class disclosed herein is capable of providing about a 40 percent change in dimension in the direction of the stressing of the material while performing approximately 50 foot-pounds of work per pound of polymer. Thus, if the shrinkable element is in the form of a cord or a rope which has been pre-stressed along its length, it is possible for a one-pound piece of polymer properly shaped to lift a 50-pound weight a distance of 1 foot.

The shrinkable material according to the present invention is also useful as an electrical rope woven of shrinkable polymer fibers and coated with resistive heating films for lifting loads or applying tension to overhead wires. The shrinkable material according to this invention may also be used for operating switches, valves, or other devices requiring mechanical movement. The shrinkable material is particularly useful for operating mechanical devices where such devices should be operated by remote control, such as where they are not readily accessible. Although the invention describes shrinkable material having thermally resistive material deposited on the outside thereof of the tube, it may be desirable in some cases to provide a resistive material on the inner surface of a tube. Also, the shrinkable element may be any desirable device, such as a rod or rope, and the example of an elongated tube is given only as a single example of one form of the invention.

This invention is not to be limited by the embodiments shown in the drawings and described in the description, which are given by way of example and not of limitation, but only in accordance with the scope of the appended claims.

What is claimed is:

1. A device having regions which are selectively shrinkable comprising: a body which is shrinkable by the application of heat, said body having a surface; a layer of electrically conductive material having the inherent property of electrical resistance, and of generating heat when an electrical current is passed through it, said layer being in contiguous contact with said surface and covering an area to be shrunk which occupies less than the total area of the surface, and shaped selectively to shrink a selected surface pattern of the surface upon passage of an electrical current through said layer sufficient to heat the contiguous portion of the surface to a temperature at which it will shrink.

2. A device according to claim 1 wherein said shrinkable body is a prestressed polymer having a crystalline structure and a crystalline melting point, said current being sufficient to raise the temperature of said portion of the body adjacent to the layer to a temperature above said crystalline melting point.

3. A device according to claim 1 wherein said element is a shrinkable tube.

4. The method of locally shrinking only a portion of a total area of a body of heat shrinkable material comprising: applying to said surface in a pattern covering less than the total area of said surface a layer of electrically conductive material which generates heat as a consequence of passage of an electrical current therethrough, and passing an electrical current therethrough sufficient to heat the contiguous portion of the surface to a temperature at which it will shrink, whereby to heat and shrink that portion, and only that portion, of the surface.

* * * * *